United States Patent [19]

McNeill et al.

[11] 4,432,614
[45] Feb. 21, 1984

[54] HIGH FREQUENCY LIGHT MODULATOR

[75] Inventors: William H. McNeill, Carlisle; Yung J. Chen, Weston, both of Mass.

[73] Assignee: GTE Laboratories Incorporated, Waltham, Mass.

[21] Appl. No.: 451,646

[22] Filed: Dec. 20, 1982

[51] Int. Cl.³ .............................................. G05D 25/02
[52] U.S. Cl. ................................................... 350/386
[58] Field of Search ......................... 350/386, 359, 363

[56] References Cited

U.S. PATENT DOCUMENTS 3,153,691 10/1964 Kibler .................................. 350/359
4,128,299 12/1978 Maher ............................. 350/359 X

FOREIGN PATENT DOCUMENTS 593174 2/1978 U.S.S.R. ............................. 350/385

OTHER PUBLICATIONS

Gordon, J. G. II et al, "Electrochromic Attenuated Total Reflection Modulator", IBM Tech. Disclosure Bull, vol. 22 No. 5, Oct. 1979 p. 2074.

*Primary Examiner*—Bruce Y. Arnold
*Attorney, Agent, or Firm*—Fred Fisher

[57] ABSTRACT

An electrooptic device for controlling the intensity of a monochromatic light beam comprises a transparent element having opposed planar surfaces operable to reflect a collimated light beam alternately from the two surfaces. A plurality of semiconductor structures contact one surface of the device at regions where the collimated light beam reflects from that surface. Each semiconductor structure includes a thin layer of a material such as a metal in contact with the planar surface of the transparent element and a semiconductor material adjacent to the metal layer. A voltage source provides a potential between the metal layer and the semiconductor material of each structure to separately alter the charge density in the semiconductor material of each structure to affect the degree of coupling between the light beam entering the device and surface plasmon waves generated within each structure. The device is operable as a signal mixer or an optical logic switching device.

13 Claims, 2 Drawing Figures

HIGH FREQUENCY LIGHT MODULATOR

CROSS-REFERENCE TO RELATED APPLICATIONS

This application discloses and claims subject matter related to subject matter disclosed and claimed in co-pending application Ser. No. 451,647 (Attorney's Docket No. 23434) entitled "High Frequency Light Modulation Device", filed concurrently herewith in the names of William H. McNeill and Y. J. Chen and assigned to the present assignee.

BACKGROUND OF THE INVENTION

This invention relates to electrooptical devices. More particularly, it is concerned with electrooptical devices and methods for the rapid modulation and signal mixing of a collimated light beam.

Devices are known in the art which modulate a polarized light beam by means of the combination of a Kerr cell and a Glan-Thomson prism (see, for example, U.S. Pat. No. 3,501,220 to Bernal et. al.). These devices employ the Kerr effect to rotate the plane of a polarized light beam as it passes through an electrooptic cell to which an alternating electric field is applied. The light is then passed through the Glan-Thomson prism to deflect the light along one path or another depending upon the state of polarization. Devices of this type require relatively high voltages for their operation, typically of the order of several hundred volts.

Other light modulation devices are known in which a transducer physically moves one or more of the elements of the device to modulate the light beam (see, for example, U.S. Pat. No. 3,514,183 to Rabedeau). U.S. Pat. No. 4,165,155 to Gordon, II et al. discloses a device for modulating a collimated light beam employing an optically transparent element such as a prism separated from a smooth metal surface by a gap filled with a medium, such as air, having a refractive index less than that of the prism. A light beam passing through the prism is modulated by mechanically varying the spacing of the gap between the prism face and the smooth metal surface by means of, for example, a piezoelectric transducer. The frequency response of devices of the type where one or more elements of the system must be physically moved is limited by the rate at which the elements of the system can be mechanically oscillated.

OBJECTS AND SUMMARY OF THE INVENTION

It is therefore an object of the present invention to provide a device and method for electrooptically controlling the intensity of a collimated light beam which obviates the need to physically move elements of the device to modulate the light beam.

It is a further object of the present invention to provide a device and method for electrooptically varying the intensity of a collimated light beam which is capable of very high modulation frequencies.

It is another object of the present invention to provide an electrooptic device which operates at comparatively low applied voltages to rapidly modulate a collimated light beam.

It is yet a further object of this invention to provide an electrooptic device for mixing signals to vary the intensity of a collimated light beam.

These and other objects are achieved in accordance with the present invention wherein an electrooptic device for controlling the intensity of a collimated monochromatic light beam comprises a first element transparent to the monochromatic light beam and having first and second opposed planar surfaces operable to reflect the collimated light beam alternately from the first and second planar surface. A plurality of structures are in contact with the second planar surface at regions where the collimated light beam reflects from the second planar surface, each of the structures forming an interface with the second planar surface. Each of the structures comprises a portion of a material of negative dielectric constant in contact with the second planar surface and a portion of a semiconductor material adjacent to the material of negative dielectric constant. Means are provided for separately varying the charge density of semiconductor material in the semiconductor portion of each of the structures to affect the degree of coupling between the monochromatic light beam incident at each of the interfaces and surface plasmon waves generated in each of the structures whereby the intensity of the collimated monochromatic light beam reflected from each interface varies with the charge density in each of the structures.

For a better understanding of the present invention together with other and further objects, advantages and capabilities thereof, reference is made to the following disclosure and appended claims in connection with the above-described drawing figures.

DETAILED DESCRIPTION

The device of the present invention provides a novel means for controlling or rapidly modulating the intensity of a collimated light beam by rapid variation of the degree of coupling between a light beam incident to a surface and surface plasmons generated by the light beam within the device. Surface plasmons are electromagnetic waves which propagate along the interface between two media but which decrease exponentially in amplitude with the distance perpendicularly from the interface. (For a detailed discussion of surface plasmons see, for example, E. Burstein et al., J. Vac. Sci. Technol., Vol. 11, No. 6, pp. 1004–1019, 1974.) Depending upon a variety of parameters, the coupling of the incident light beam with the surface plasmons is strong or weak. When conditions favor strong coupling between the light beam and the surface plasmons, the light beam loses much of its energy to the surface plasmon wave, and the reflected light beam is correspondingly attenuated. On the other hand, when the coupling is weak, there is correspondingly little attenuation of the light beam, and most of the energy is reflected from the interface.

Figure 1:
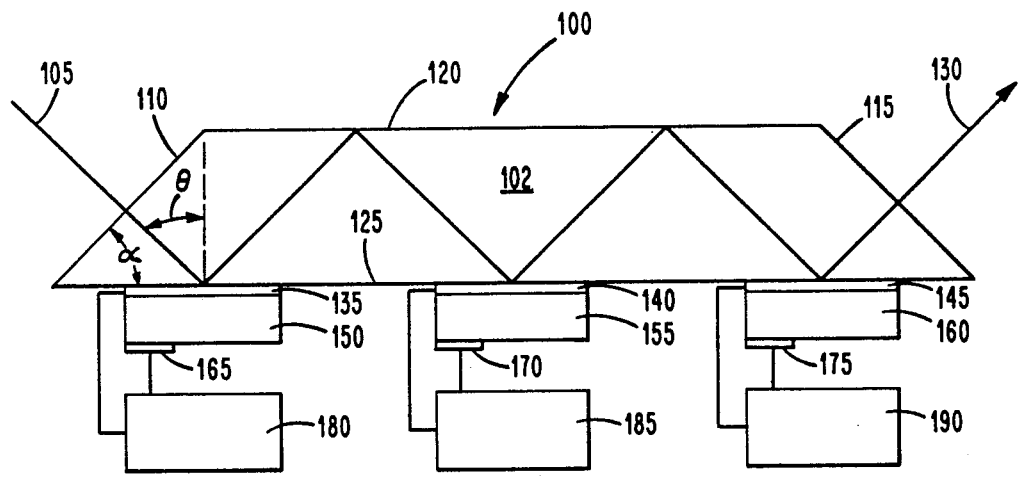
FIGS. 1 and 2 are schematic representations of alternative embodiments of the device of the present invention.

Referring to FIG. 1, there is shown one embodiment of the device of the present invention. As shown there, the device 100 comprises a transparent element 102 fabricated from a material which is transparent to the wavelength of the light beam which is to be controlled. The element is made of any suitable vitreous, plastic, or single-crystal material which is transparent in the desired region of the electromagnetic spectrum. For example, in one particular application, the device of this invention is useful for the control of a collimated laser light beam in optical fiber communications. It is known that light of approximately 1 micron wavelength is preferred for optical fiber communications because of the low losses when light of this wavelength is transmitted through glass fibers. In such an application, the same glass is employed for fabrication of the transparent element of the device and the optical fibers.

As shown in the embodiment illustrated in FIG. 1, the element 102 is in the form of a truncated triangular prism having end surfaces 110 and 115 and opposed planar surfaces 120 and 125. A collimated light beam 105 is shown entering end surface 110 of the transparent element 102 at an incident angle $\theta$, greater than the critical angle, so that the light beam 105 is totally reflected from both surfaces. The light beam 105 is shown reflecting alternately from the upper surface 120 and the lower surface 125 of element 102 and exiting the transparent element 102 through end surface 115. Contacting the lower surface 125 at each region where light beam 105 reflects from the lower surface 125 are thin layers of a material of negative dielectric constant 135, 140, and 145. Layers 135, 140, and 145 are preferably a metal selected from the group including aluminum, silicon, nickel, copper, zinc, palladium, silver, cadmium, platinum, gold, and mixtures thereof. The metal is deposited on the base of the transparent element 102 by sputtering, vapor deposition, plating, or other techniques well known in the art. The thickness of the metal layer is preferably between about 100–500 Angstrom units, more preferably between about 200–300 Angstrom units.

In the embodiment shown in FIG. 1, a layer of semiconductor material 150, 155, or 160 such as doped silicon, gallium arsenide, and the like contacts the metal layer in each structure to form a rectifying junction between the two layers. A voltage source 180, 185, or 190 provides a voltage signal through connections to the metal layer in each structure and the semiconductor layers through ohmic contacts 165, 170, and 175. When a monochromatic light beam 105 enters the transparent element 102 at the proper incident angle, $\theta$, it establishes a surface plasmon wave in each metal layer 135, 140, and 145. The wave extends a finite distance into the semiconductor material 150, 155, and 160 underlying the metal layers. Coupling between the incident light beam and surface plasmon waves generated in the metal layers and the semiconductor regions occurs when the angle of incidence, $\theta$, has the value:

$$\theta = \arcsin \frac{1}{n_p} Re \left( \frac{e_b e_c}{e_b + e_c} \right)^{\frac{1}{2}}$$

where $n_p$ is the refractive index of the prism material, $e_b$ is the complex term of the dielectric constant of the metal, $e_c$ is the complex term of the dielectric constant of the semiconductor material, and Re is the real part of the fraction $e_b e_c/(e_b + e_c)$. Although the incident light beam 105 may enter the transparent element 102 at an angle which deviates slightly from normal to end surface 110, it is preferred that the light beam 105 enter the element 102 at an angle which is normal to surface 110. In this preferred embodiment, the prism angle, $\alpha$, is correspondingly chosen to be equal to the angle, $\theta$.

When conditions favor the formation of a surface plasmon wave, the exiting light beam 130 reflected from the interface between the metal layer and the transparent element surface at each region of reflection is considerably attenuated through energy loss to the surface plasmon wave. Application of a small potential between the metal layer and the semiconductor material in each structure results in the formation of either a depletion-/inversion or accumulation layer in the semiconductor material. This alteration in the charge density of the semiconductor material affects the degree of coupling between the incident light beam and the surface plasmon wave by partially or completely destroying the plasmon wave. A decrease in coupling results in greater intensity of the reflected light beam. The magnitude of the charge density in the semiconductor material in the region supporting a plasmon wave and, correspondingly, the intensity of reflected light is proportional to the applied voltage across the thin metal layer and the semiconductor.

In one application of the device of this invention, light beam 105 is modulated by applying a small voltage signal of complex waveform between the semiconductor material and the thin metal layer in each of the semiconductor structures. The resulting modulation of the charge density in the semiconductor material of each structure modulates the reflected light beam at each interface in such a manner that its intensity varies with the same waveform. The resulting effect is to mix the signals applied at each semiconductor structure to modulate the exiting light beam with a waveform which varies as the sum of the applied voltage signals. Since no elements of the device are physically moved to modulate the light beam, the frequency response to the device is high.

In an alternative application of the device of this invention, the device is operated as a logical switching device which may be fabricated in a normally-on or normally-off embodiment. By the terms "normally-on" or "normally-off", the reference is to the exiting light beam. If the entering light beam exits the transparent element with little or no loss to coupled surface plasmon waves in each of the semiconductor structures, the device is operating in a normally "on" mode. If, on the other hand, the entering light beam loses energy to surface plasmon waves generated at any one or all of the semiconductor structures so that there is little or no light energy exiting the transparent element, the device is constructed in the normally "off" mode.

In the "normally on" embodiment, the prism angle, $\alpha$, and the angle of incidence, $\theta$, are chosen so that, in accordance to the relationship given above, a surface plasmon wave is not normally established in any of the semiconductor structures. Application of a direct current voltage signal of the appropriate magnitude to any one of the semiconductor structure between the metal layer and the semiconductor material alters the charge density of the semiconductor material in that particular structure in such a way to establish a surface plasmon wave. Once the surface plasmon wave is established, energy loss from the entering light beam to the surface plasmon wave turns the exiting light beam "off". In this embodiment of the device, it is necessary that no voltage signal be applied to any of the semiconductor structures in order for the maximum light output from the transparent element be realized. Conversely, the application of the appropriate voltage signal to any of the semiconductor structures results in marked attenuation of the light intensity exiting from the transparent element.

In the "normally-off" embodiment, the prism angle, α, and the angle of incidence, θ, of the entering light beam are chosen to support the establishment of a surface plasmon wave in each of the semiconductor structures, in accordance with the relationship given above. Under this condition, the energy of the entering light beam is transferred to the surface plasmon waves and little or no light exits the transparent element under normal conditions. The application of a small direct current voltage signal between the metal layer and the semiconductor material at each semiconductor structure destroys the surface plasmon wave and the exiting light beam is turned "on". In this embodiment of the device, it is necessary that a small voltage signal be applied to each of the semiconductor structures to maximize the light intensity of the exiting light beam.

Figure 2:
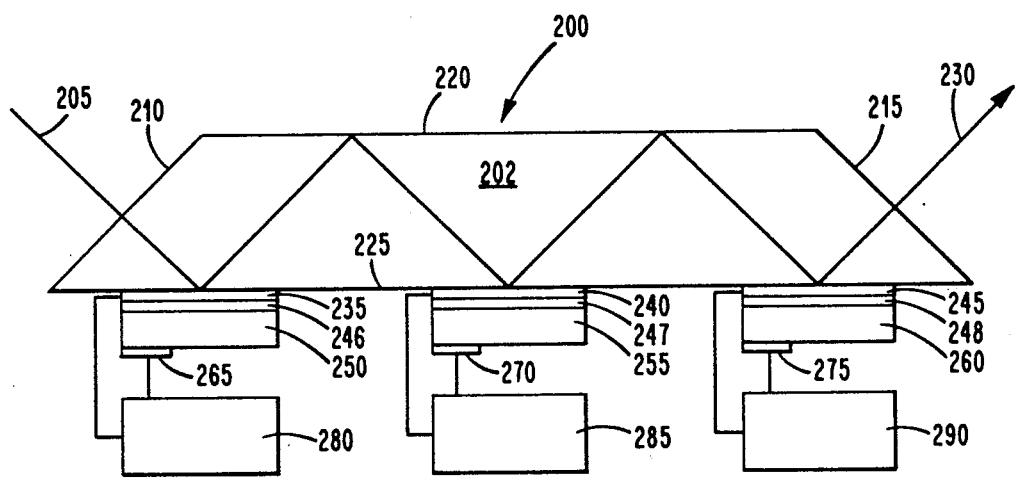

In FIG. 2, there is shown an alternative embodiment of the device of this invention. In this embodiment, a thin layer of metal 235, 240, or 245 is in contact with the planar surface 225 of the transparent element 202 at each of the semiconductor structures. As discussed above, the structures are placed along the lower surface of the transparent element 202 in regions where the collimated light beam 205 reflects from the surface 225. Contiguous with the thin metal layers 235, 240, and 245 in each structure is a thin layer 246, 247 and 248, preferably up to about 100 Angstrom units in thickness, of an electrically nonconducting material such as a metal oxide. Contiguous with the non-conducting layer in each structure is a layer of semiconductor material 250, 255, and 260. Voltage sources 280, 285, and 290 provide small voltage signals between the metal layer and the semiconductor material in each structure through ohmic contacts 265, 270, 275. Since the non-conducting layer prevents current flow between the metal layer and the semiconductor material, the polarity of the applied voltage may be in either direction. As discussed above, the application of a voltage results in the production of either a depletion/inversion layer or an accumulation layer in the semiconductor material in each structure, correspondingly changing the charge density of the semiconductor material.

As discussed in detail above, this embodiment of the device may be constructed in the "normally on" or "normally off" mode to produce a logic switching device for the collimated light beam. While there have been shown and described what are at present believed to be the preferred embodiments of the present invention, it will be obvious to one of ordinary skill in the art to which the invention relates that various changes and modifications may be made therein without departing from the scope of the invention as defined by the appended claims.

What is claimed is:

1. An electrooptic device for controlling the intensity of a collimated monochromatic light beam, said device comprising:
    a first element transparent to said monochromatic light beam and having first and second planar surfaces operable to alternately reflect said collimated light beam from said first and second planar surface;
    a plurality of structures each in contact with said second planar surface at regions where said collimated light beam reflects from said second planar surface, each of said structures forming an interface with said second planar surface;
    each of said structures comprising a portion of a material of negative dielectric constant in contact with said second planar surface and a portion of a semiconductor material coupled to said material of negative dielectric constant; and
    means for separately varying the charge density of semiconductor material in the semiconductor portion of each of said structures to affect the degree of coupling between said monochromatic light beam incident at each of said interfaces and surface plasmon waves generated in each of said plurality of elements whereby the intensity of said collimated monochromatic light beam reflected from the interface at each of said elements varies with the charge density in each of said elements.

2. An electrooptic device in accordance with claim 1 wherein said portion of material of negative dielectric constant comprises a thin layer of metal selected from the group consisting of aluminum, silicon, nickel, copper, zinc, palladium, silver, cadmium, platinum, gold, and mixtures thereof.

3. An electrooptic device in accordance with claim 2 wherein said thin layer of metal is of a thickness between about 100 Angstrom units and 500 Angstrom units.

4. An electrooptic device in accordance with claim 3 wherein said thin layer of metal of a thickness between about 200 Angstrom units and 300 Angstrom units.

5. An electrooptic device in accordance with claim 2 wherein said means for varying the charge density in said semiconductor portion includes means for applying a variable voltage between said thin metal layer and said portion of semiconductor material.

6. An electrooptic device for controlling the intensity of a collimated monochromatic light beam, said device comprising:
    a first element transparent to said monochromatic light beam and having first and second end and first and second opposed planar surfaces operable to alternately reflect said collimated light beam entering said first end of said first element from said first and said second planar surfaces;
    a plurality of spaced apart elements in contact with said second surface of said first element in regions where said collimated light beam reflects from said second planar surface of said first element;
    each of said plurality of elements comprising a thin layer of metal in contact with said second surface of said first element to form an interface therewith and a portion of a semiconductor material contiguous with said thin layer of metal to form a rectifying barrier therebetween;
    and means for separately applying voltage signals reverse biasing the thin metal layer in each of said elements with respect to the portion of semiconductor material in each of said elements to vary the charge density of semiconductor material in each of said elements to affect the degree of coupling between said monochromatic light beam incident upon each interface and surface plasmon waves generated in each of said elements whereby the intensity of said collimated monochromatic light beam reflected from said second planar surface at each of said interfaces varies independently with the voltage signal applied to each of said elements.

7. An electrooptic device in accordance with claim 6 wherein said thin layer of a metal is selected from the group consisting of aluminum, silicon, nickel, copper, zinc, palladium, silver, cadmium, platinum, gold, and mixtures thereof.

8. An electrooptic device in accordance with claim 7 wherein said thin layer of metal is of a thickness between about 100 Angstrom units and 500 Angstrom units.

9. An electrooptic device in accordance with claim 8 wherein said thin layer of metal is of a thickness between about 200 Angstrom units and 300 Angstrom units.

10. An electrooptic device for controlling the intensity of a collimated monochromatic light beam, said device comprising:
- a first element transparent to said monochromatic light beam and having first and second ends and first and second opposed planar surfaces operable to alternately reflect said collimated light beam entering said first end of said first element from said first and said second planar surfaces;
- a plurality of spaced apart elements in contact with said second surface of said first element in regions where said collimated light beam reflects from said second planar surface of said first element;
- each of said plurality of elements comprising a thin layer of metal in contact with said second surface of said first element to form an interface therewith, a thin layer of an electrically non-conductive material contiguous with said thin layer of metal, and a portion of a semiconductor material contiguous with said thin layer of electrically non-conducting material;
- and means for separately applying voltage signals between the thin metal layer and the portion of semiconductor material in each of said elements to vary the charge density of semiconductor material in each of said elements to affect the degree of coupling between said monochromatic light beam incident upon each interface and surface plasmon waves generated in each of said elements whereby the intensity of said collimated monochromatic light beam reflected from said second planar surface at each of said interfaces varies independently with the charge density in each of said elements.

11. An electrooptic device in accordance with claim 10 wherein said thin layer of a metal is selected from the group consisting of aluminum, silicon, nickel, copper, zinc, palladium, silver, cadmium, platinum, gold, and mixtures thereof.

12. An electrooptic device in accordance with claim 11 wherein said thin layer of metal is of a thickness between about 100 Angstrom units and 500 Angstrom units.

13. An electrooptic device in accordance with claim 12 wherein said thin layer of metal is of a thickness between about 200 Angstrom units and 300 Angstrom units.

* * * * *